(12) United States Patent
Rudy et al.

(10) Patent No.: US 12,433,447 B2
(45) Date of Patent: Oct. 7, 2025

(54) COUNTERBALANCE FOR UPPER GRIDDLE PLATEN

(71) Applicant: AccuTemp Products, Inc., Fort Wayne, IN (US)

(72) Inventors: Raymond R. Rudy, Huntington, IN (US); Gary L. Seitz, Decatur, IN (US); Craig A. Seitz, Decatur, IN (US); Dale W. Taylor, Hamilton, IN (US); Cole Bruick, Fort Wayne, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 865 days.

(21) Appl. No.: 17/696,759

(22) Filed: Mar. 16, 2022

(65) Prior Publication Data

US 2023/0292954 A1 Sep. 21, 2023

(51) Int. Cl.
*A47J 37/06* (2006.01)
(52) U.S. Cl.
CPC .... *A47J 37/0611* (2013.01); *A47J 2037/0617* (2013.01)

(58) Field of Classification Search
CPC ............... A47J 37/0611; A47J 2037/0617
USPC ................ 99/372, 377, 379, 389, 390
See application file for complete search history.

(56) References Cited

U.S. PATENT DOCUMENTS

| 5,423,253 | A  | * | 6/1995 | Olson | A47J 37/0611 100/270 |
| 5,890,419 | A  | * | 4/1999 | Moravec | A47J 37/0611 99/372 |
| 8,162,026 | B1 | * | 4/2012 | Lundahl | E05D 15/24 160/192 |
| 8,763,519 | B2 | * | 7/2014 | Ricchio | A47J 37/0611 99/372 |
| 2019/0357727 | A1 |  | 11/2019 | Rudy et al. | |

FOREIGN PATENT DOCUMENTS

GB          2369857 A  *  6/2002  ......... E05D 13/1261

* cited by examiner

*Primary Examiner* — Reginald Alexander
(74) *Attorney, Agent, or Firm* — Faegre Drinker Biddle & Reath LLP (57) ABSTRACT

A griddle system including an adjustable counterbalance for an upper platen assembly is disclosed.

19 Claims, 10 Drawing Sheets

COUNTERBALANCE FOR UPPER GRIDDLE PLATEN

BACKGROUND

1. Technical Field

The present disclosure is directed to a griddle and, in particular, to a griddle with an upper platen. More particularly, the present disclosure is directed to a counterbalance for the upper platen.

2. Description of the Related Art

Griddles can feature upper platen assemblies suited for a variety of purposes, including searing (see. e.g., U.S. patent application Ser. No. 17/534,807, the entire disclosure of which is hereby explicitly incorporated herein by reference) and/or cooking. A counterbalance for the upper platen assembly is desirable to decrease the force required to articulate the upper platen assembly from a closed, cooking position in close proximity to the lower platen of the griddle to an open, food loading position spaced from the lower platen.

SUMMARY

The present disclosure provides a griddle system including a counterbalance to minimize the effort required to pivot an upper platen assembly between its open and closed configurations. The counterbalance of the present disclosure is adaptable to a variety of upper platen assemblies because it incorporates an adjuster to adjust the assistance provided by the counterbalance. The counterbalance assembly of the present disclosure is useable with a variety of upper platen assemblies, including, without limitation the upper platen assemblies of co-pending U.S. patent application Ser. No. 16/410,677 entitled MODULAR GRIDDLE WITH SEARING DEVICE, the entire disclosure of which is hereby explicitly incorporated by reference herein.

In one form thereof, the present disclosure provides a griddle comprising: a lower cooking surface; an upper platen assembly rotatably connected to the lower cooking surface, the upper platen assembly rotatable about a pivot axis from an open position to a closed position relative to the lower cooking surface, whereby a food product can be loaded for cooking between the upper platen assembly and the lower cooking surface when the upper platen assembly maintains the open position and the food product is positioned for cooking between the upper platen assembly and the lower cooking surface when the upper platen assembly maintains the closed position; and a counterbalance, the counterbalance having a preload to urge the upper platen assembly from the closed position to the open position, the counterbalance including a stop surface moveable to adjust the preload of the counterbalance.

In embodiments, the lower cooking surface comprises a heated lower platen.

In embodiments, the upper platen assembly comprises a heated upper platen.

In embodiments, the counterbalance comprises: a torsion spring and wherein the preload comprises a torsion load on the torsion spring, the stop surface setting a limit establishing the torsion load.

In embodiments, the counterbalance further comprises: a pivot shaft, the upper platen assembly secured for rotation with the pivot shaft, the torsion spring helically wound around the pivot shaft, the torsion spring having a first torsion spring free end and a second torsion spring free end; and a first tension preload collar, the first tension preload collar rotatably supported relative to the pivot shaft, whereby the first tension preload collar is rotatable relative to the pivot shaft, the first torsion spring free end secured to the first tension preload collar, the stop surface establishing a stop preventing a rotation of the first tension preload collar about the pivot axis due to the preload of the counterbalance.

In embodiments, the counterbalance further comprises: a second tension preload collar, the second torsion preload collar secured for rotation with the pivot shaft, the second torsion spring free end secured to the second tension preload collar.

In embodiments, the counterbalance comprises a set screw, the set screw comprising the stop surface.

In embodiments, the counterbalance comprises a support having a first integral arm extending therefrom and a second integral arm extending therefrom; the support, first integral arm, and the second integral arm forming a monolithic component.

In embodiments incorporating a monolithic support having a first integral arm extending therefrom and a second integral arm extending therefrom, a pivot shaft of the counterbalance can be rotatably supported by the first integral arm and the second integral arm.

In embodiments, incorporating a monolithic support having a first integral arm extending therefrom and a second integral arm extending therefrom, and the stop surface is provided by a set screw, the set screw can be threadably engaged with an integral arm of the support such that a rotation of the set screw moves the set screw to adjust the preload of the counterbalance. In embodiments, a pin extends from a first tension preload collar into an arcuate slot formed in the first integral arm, the arcuate slot sized and shaped to allow the pin undergo a rotation about the pivot axis, the set screw extending into the arcuate slot to block the rotation due to the torsion load of the torsion spring. In embodiments, a safety set screw blocks the set screw from backing out.

In embodiments, the pin comprises an offset pin having a tension preload collar end defining a tension preload collar end longitudinal axis, the offset pin also having a support end defining a support end longitudinal axis, the tension preload collar end longitudinal axis offset from the support end longitudinal axis.

In embodiments, the stop surface is moveable by cooperative threading.

In embodiments, the stop surface is formed on an end of a set screw.

In an alternative form of the present disclosure, a method of adjusting a counterbalance supporting an upper platen above a lower cooking surface of a griddle is provided, the method comprising: replacing a first pin setting a preload of the counterbalance with a second pin, the second pin comprising an offset pin having a first end with a first end longitudinal axis and a second end with a second end longitudinal axis, the first end longitudinal axis offset from the second end longitudinal axis by a first distance, the preload of the counterbalance altered from a first preload prior to the replacing step to a second preload different from the first preload subsequent to the replacing step.

In embodiments, the method further comprises: adjusting the position of one of the first pin and the second pin to adjust a counterbalance force supplied by the counterbalance. In embodiments, the adjusting step comprises a step of moving a stop surface cooperating with one of the first pin and the second pin to set the counterbalance force supplied by the counterbalance to a second position different from a first position occupied by the stop surface prior to the adjusting step.

In embodiments, the moving step comprises threading the stop surface from the first position to the second position.

In embodiments, the method further comprises: replacing the second pin with a third, offset pin, the third pin having a third pin first end with a third pin first end longitudinal axis and a third pin second end with a third pin second end longitudinal axis, the third pin first end longitudinal axis offset from the third pin second end longitudinal axis by a second distance different from the first distance, the preload of the counterbalance altered from the second preload prior to a third preload different from the second preload subsequent to the replacing the second pin with a third, offset pin step.

In embodiments, the method further comprises: adjusting the position of one of the first pin, the second pin, and the third pin to adjust a counterbalance force supplied by the counterbalance.

In embodiments, the adjusting step comprises a step of moving a stop surface cooperating with one of the first pin, the second pin, and the third pin to set the counterbalance force supplied by the counterbalance to a second position different from a first position occupied by the stop surface prior to the adjusting step.

In embodiments, the moving step comprises threading the stop surface from the first position to the second position.

In embodiments, the adjusting step comprises the step of adjusting the orientation of the second pin relative to the counterbalance.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates an embodiment of the invention, the embodiment disclosed below is not intended to be exhaustive or to be construed as limiting the scope of the invention in any manner.

DETAILED DESCRIPTION

Figure 1:
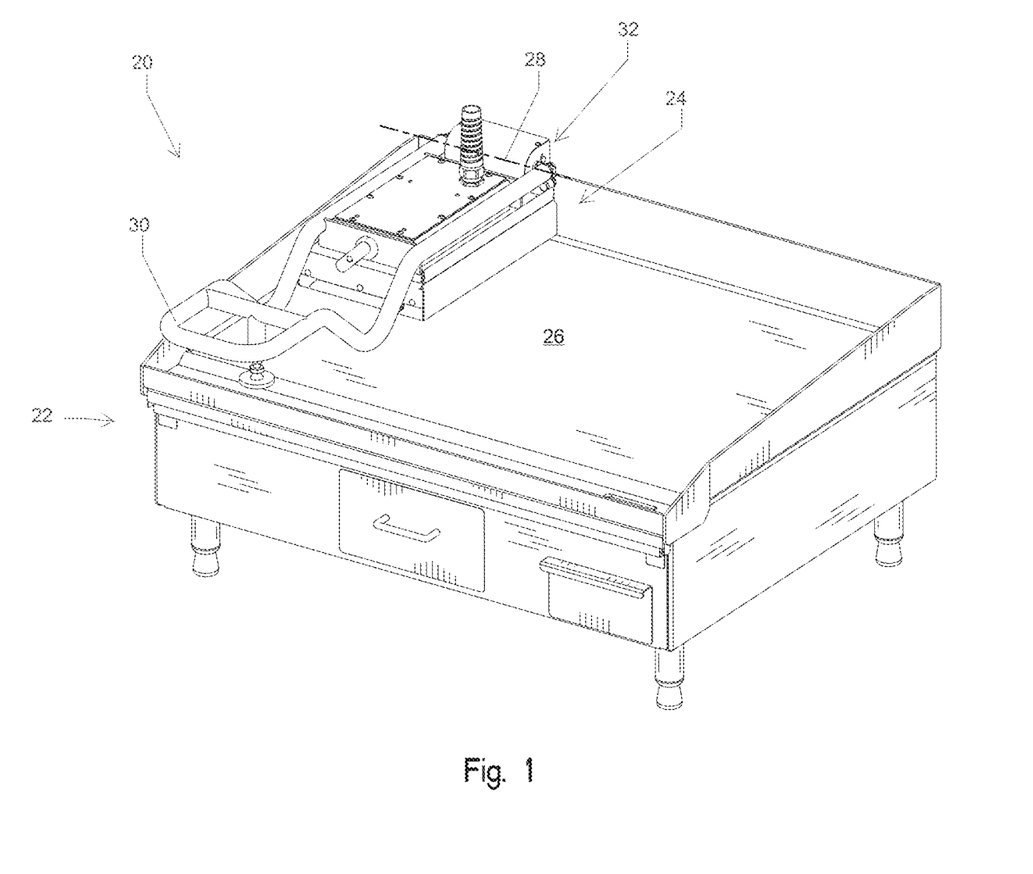
FIG. 1 is a perspective view of a griddle incorporating an upper platen assembly having a counterbalance in accordance with the present disclosure.
Figure 2:
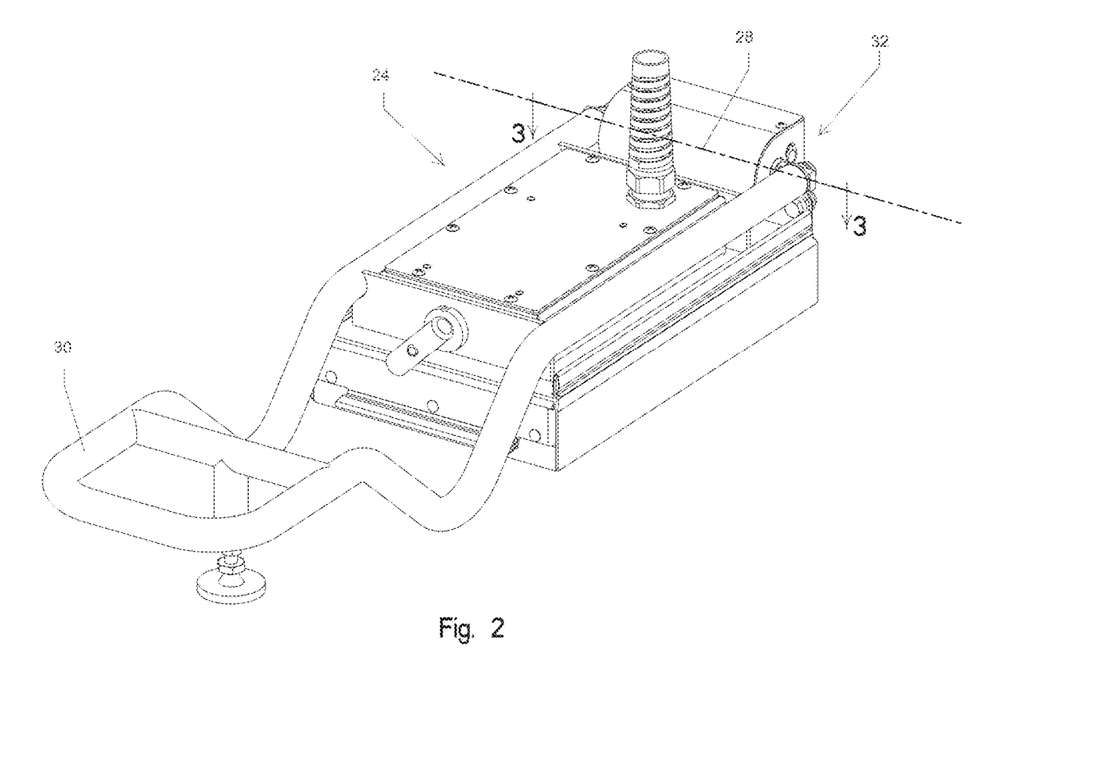
FIG. 2 is a perspective view of the upper platen assembly including the counterbalance.
Figure 3:
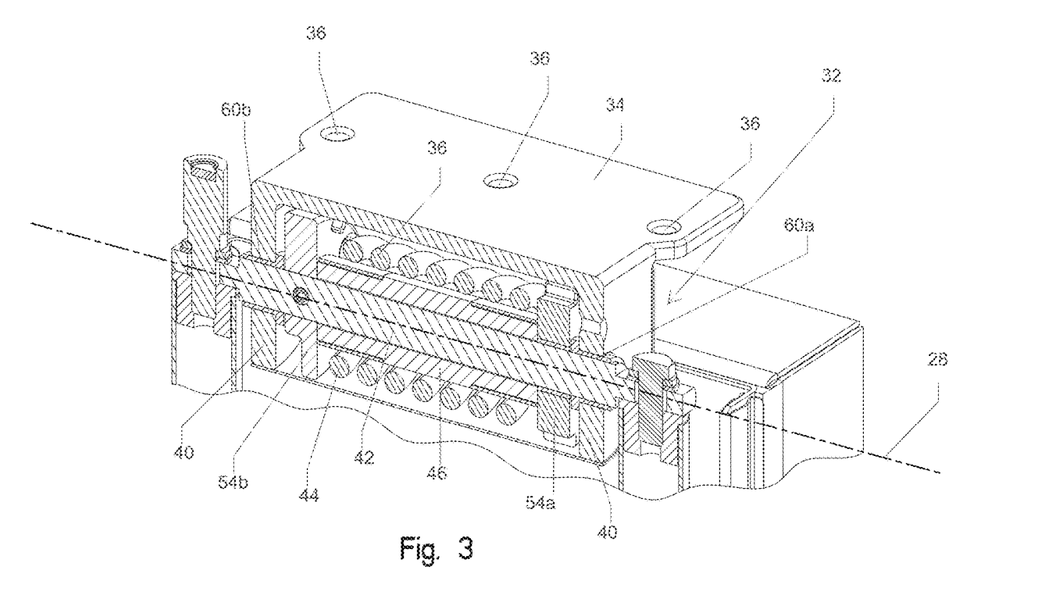
FIG. 3 is a sectional view of the counterbalance shown in the preceding figures.

FIG. 1 illustrates griddle assembly 20 including griddle 22 and upper platen assembly 24. In the embodiment illustrated, upper platen assembly 24 includes a heater for heating an upper platen positionable opposite lower platen 26 of griddle 22. In the closed position shown in FIG. 1, a food item can be placed between and in contact with the upper platen of upper platen assembly 24 and the lower platen 26 of griddle 22 in a cooking position in which the upper and lower platens both contact the food item for heating/cooking/toasting. Lower platen 26 is a heated cooking surface in the exemplification described herein. From the closed position illustrated in FIG. 1, upper platen assembly 24 can be rotated about pivot axis 28 to an open position allowing loading/unloading of food items positioned on lower platen 26. Upper platen assembly 24 can be rotated, e.g., through an arc of up to 90°. Alternative upper platen assemblies 24 may be rotated through an arc about pivot axis 28 of, for example, 45°, 50°, 55°, 60°, 65°, 70°, 75°, 80°, 85°, or 90° when positioning upper platen assembly 24 from the closed position to the open position and vice versa. The travel limits of upper platen assembly 24 are described in detail below.

To rotate upper platen assembly 24 from the closed position to the open position, a force is applied by an operator to handle 30 to rotate upper platen assembly 24 about pivot axis 28. The present disclosure provides counterbalance 32 to reduce the force on handle 30 needed to raise upper platen 24 from the closed position to the open position.

Figure 4:
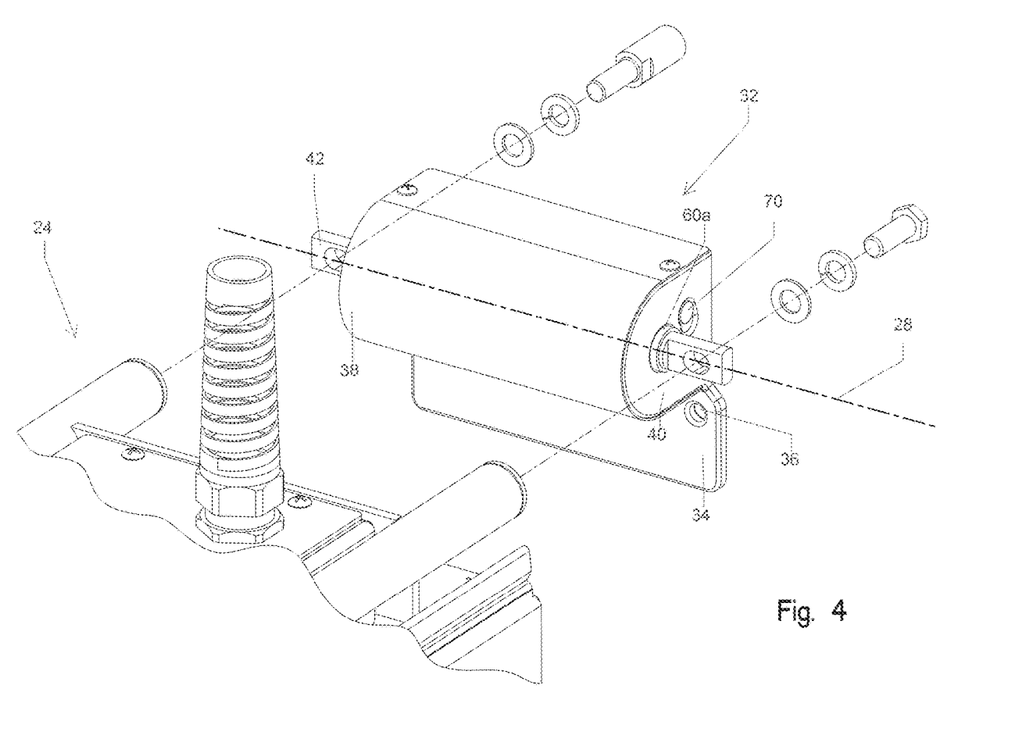
FIG. 4 is an exploded view showing assembly of an upper platen to the counterbalance.
Figure 5:
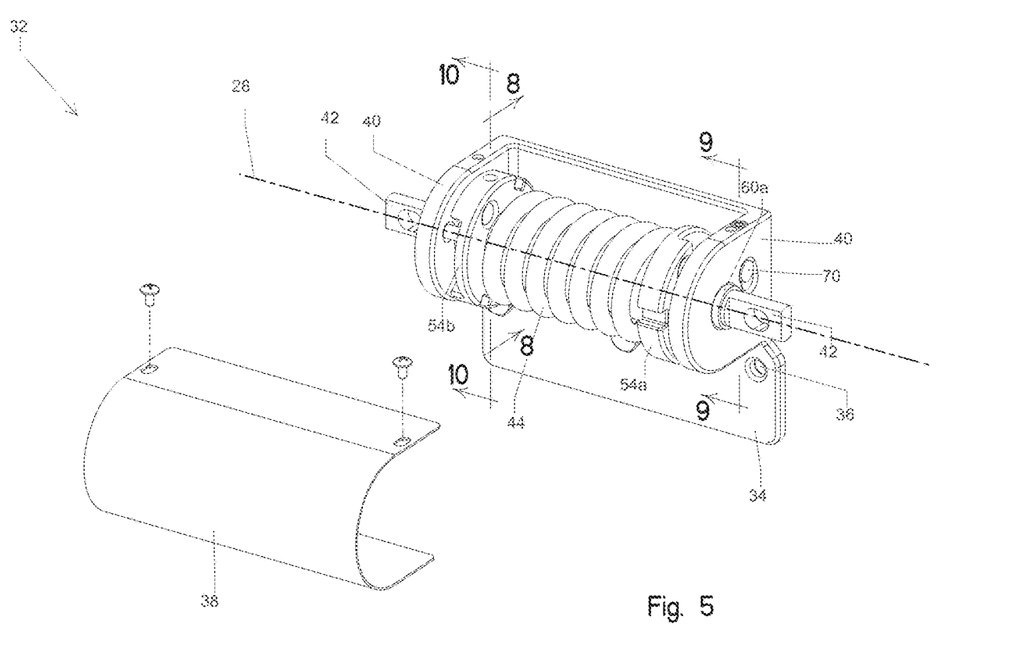
FIG. 5 is an exploded view showing removal of the cover from the counterbalance assembly.
Figure 6:
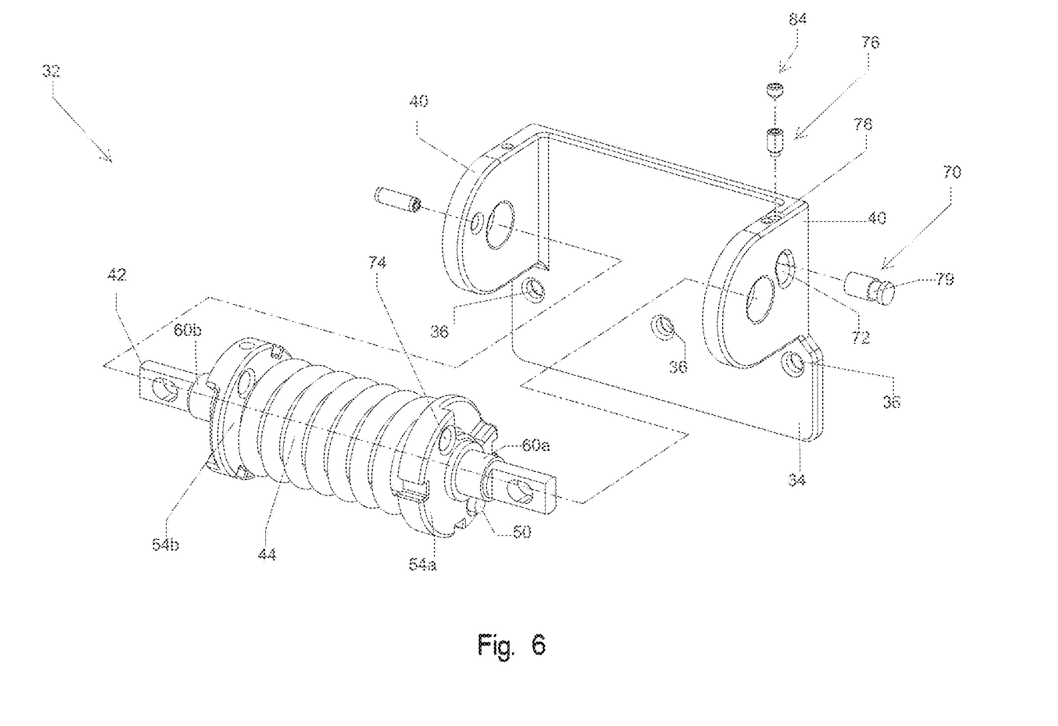
FIG. 6 is another exploded view of the counterbalance assembly, showing removal of the torsion spring assembly.
Figure 7:
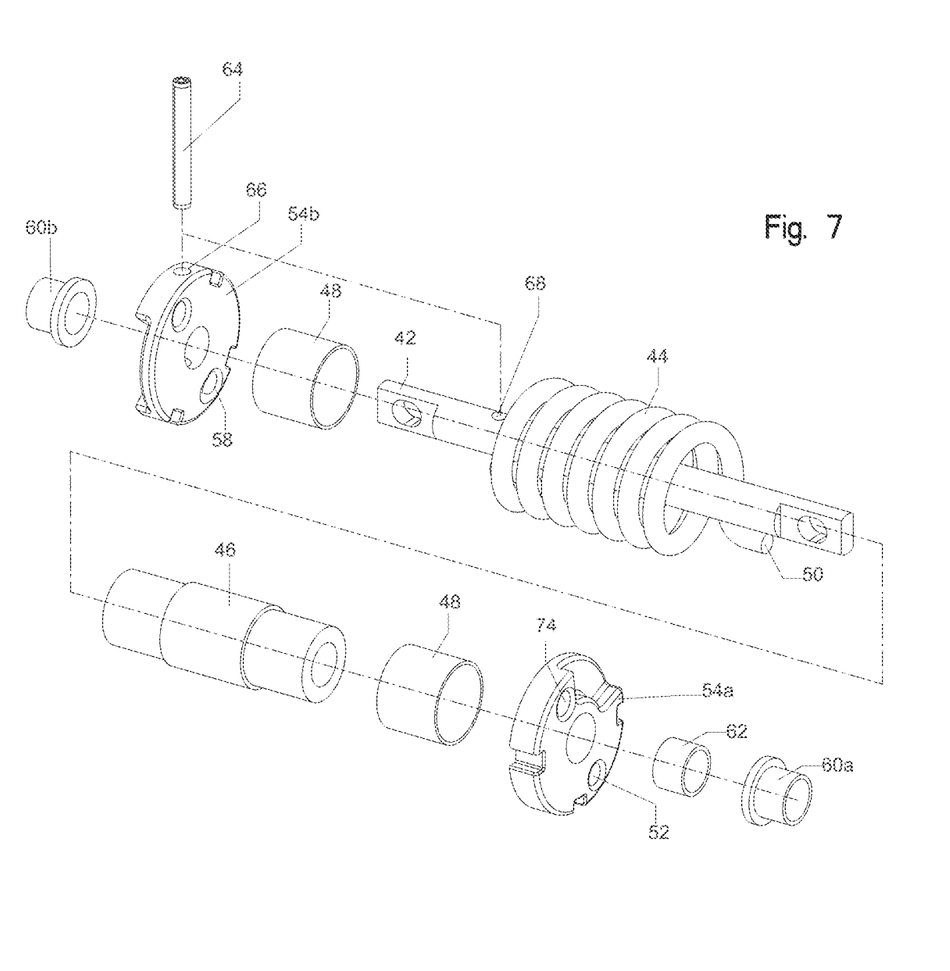
FIG. 7 is a partially exploded view of the torsion spring assembly of the counterbalance.

Referring to FIGS. 4-6, counterbalance 32 includes support 34 having lower apertures 36 for receiving fasteners to secure counterbalance 32 to griddle 22. For example, support 34 may be bolted to a splash shield positioned about the perimeter of lower platen 26. Cover 38 is securable by fasteners such as machine screws to arms 40 of support 34 to cover and protect elements of counterbalance 32. With cover 38 secured to support 34 as illustrated in FIG. 4, counterbalance 32 can be secured as a subassembly to griddle 22 and to upper platen assembly 24. To secure counterbalance 32 to upper platen assembly 24, fasteners extend through apertures at the opposite ends of pivot shaft 42 and are secured to upper platen assembly 24 so that upper platen assembly 24 and pivot shaft 42 rotate together between the open and closed positions of upper platen assembly 24.

With reference primarily to FIGS. 3-10, the structure and operation of counterbalance 32 will be explained. Potential energy stored in preloaded torsion spring 44 provides a force counterbalancing the weight of upper platen assembly 24. As described in further detail below, a first free end of torsion spring 44 is blocked from undergoing the rotation urged by the stored potential energy in torsion spring 44 by a stop associated with support 34. The opposite free end of torsion spring 44 is secured to pivot shaft 42 such that a torsional preload of torsion spring 44 imparts a lifting torque to upper platen assembly 24 from the closed position to the open position to thereby reduce the required amount of force to lift upper platen from its closed position. Counterbalance 32 may reduce the amount of force required to lift upper platen assembly 24 from the closed position to the open position to as little as 1 lb., 4 lbs. or 7 lbs., for example. In embodiments in which upper platen assembly 24 is held in the closed position (e.g., by an electromagnetic force), counterbalance 32 may provide sufficient force to raise upper platen assembly 24 from the closed position once the force holding upper platen assembly 24 in the closed position is removed.

Figure 8:
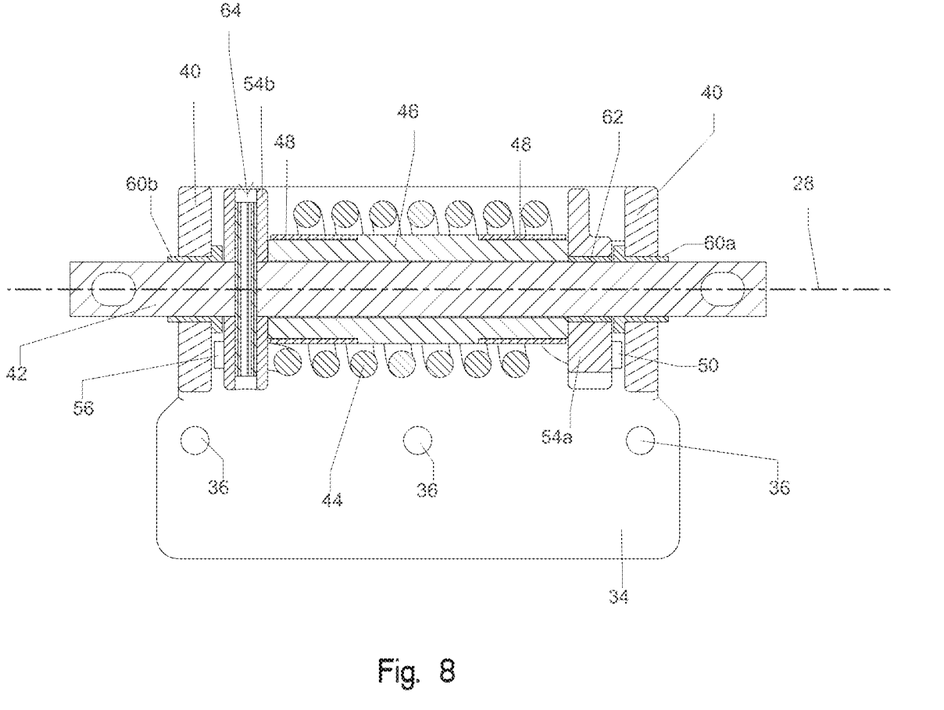
FIGS. 8-10 are each a sectional view of the counterbalance assembly of FIG. 5.

Pivot shaft 42 carries spring support sleeve 46. In alternative embodiments, spring support sleeve 46 may be rotationally secured to pivot shaft 42 such that spring support sleeve 46 and pivot shaft 42 rotate together. For example, spring support sleeve 46 may be keyed to pivot shaft 42. In the embodiment illustrated, spring support sleeve 46 is made of polyoxymethylene, such as Delrin available from DuPont USA. Spring support sleeve 46 is stepped to receive and axially index spring bearings 48 thereto. Torsion spring is positioned over spring support sleeve 46 and spring bearings 48 as shown in FIG. 8. Spring bearings 48 are made of metal, e.g., stainless steel.

First free end 50 (FIG. 6) of torsion spring 44 is positioned through spring aperture 52 (FIG. 7) of tension preload collar 54a, while second free end 56 of torsion spring 44 is positioned through spring aperture 58 of tension preload collar 54b. Alternate spring apertures, including the one illustrated, but not numbered in FIG. 7 may be provided to allow for gross adjustments of the preload of torsion spring 44. Spring apertures 52, 58 provide a close fit approaching an interference fit with free ends 50, 56 of torsion spring 44. For ease of manufacturing, tension preload collars 54a, 54b are identical, in the exemplary embodiment illustrated. In construction, tension preload collar 54a is rotated 180° about a radial axis relative to tension preload collar 54b.

Tension preload collar 54a is, in operation of counterbalance 32, held stationary relative to support 34 (which is further described below), while tension preload collar 54b is secured for rotation with pivot shaft 42. As upper platen assembly 24 rotates from the open position to the closed position, torsion spring is additionally loaded, increasing the potential energy stored by torsion spring 44. This stored potential energy provides the counterbalance to assist in raising upper platen assembly 24 from the closed position to the open position.

Bushing 60a is positioned intermediate pivot shaft 42 and a first arm 40 of support 34. Similarly, bushing 60b is positioned intermediate pivot shaft 42 and a second arm 40 of support 34. Bushings 60a. 60b provide a lubricious interface between pivot shaft 42 and support 34, as pivot shaft 42 rotates relative to support 34 when upper platen assembly is moved between its open and closed positions. The apertures in each arm 40 through which bushings 60a, 60b are positioned are nominally coaxial and an axis through the centers of these apertures is nominally parallel to a plane defined by lower platen 26. The longitudinal axis of pivot shaft 42 nominally passes through the centers of the apertures in each arm 40 through which bushings 60a, 60b are positioned, such that the pivot axis of upper platen assembly 24 is similarly nominally parallel to the plane defined by lower platen 26. When upper platen assembly 24 provides a cooking and/or searing surface and is secured for operation with counterbalance 32, the plane defined by the cooking and/or searing surface of upper platen assembly 24 is similarly nominally parallel to the longitudinal axis of pivot shaft 42.

Bushing 62 is radially positioned intermediate tension preload collar 54a and pivot shaft 42 and is axially positioned intermediate bushing 60a and spring support sleeve 46. Bushing 62 provides a lubricious interface between pivot shaft 42 and tension preload collar 54a, as pivot shaft 42 rotates relative to tension preload collar 54a, which, in operation, is blocked from rotation relative to support 34, as will be further explained below.

With second free end 56 of torsion spring 44 positioned in spring aperture 58 of tension preload collar 54b, tension preload collar 54b is secured to pivot shaft 42 via fastener 64. Radial aperture 66 intersects the central aperture through tension preload collar 54b such that fastener 64 can reach securement aperture 68 of pivot shaft 42. In the exemplification shown (FIG. 10), fastener 64 extends through radial aperture 66 and securement aperture 68 of pivot shaft 42 and then again into radial aperture 66 to fix tension preload collar 54 for rotation with pivot shaft 42. Fastener 64 can be interference fit in this position. Fastener 64 can, in alternative embodiments be a threaded shaft positionable through radial aperture 66 of tension preload collar 54b and threadably secured to securement aperture 68.

To block rotation of tension preload collar 54a urged by the stored potential energy in torsion spring 44, pin 70 is positioned through arcuate slot 72 through arm 40 of support 34 and into pin aperture 74 of tension preload collar 54a. Pin aperture 74 has an inner diameter closely approximating the outer diameter of the portion of pin 70 placed therein. In certain embodiments, the fit of pin 70 into pin aperture 74 will be just short of an interference fit. With pin 70 positioned through arcuate slot 72 (FIG. 6), and into pin aperture 74, set screw 76 is threaded into adjustment aperture 78 to present a stop surface to block rotation of tension preload collar 54a relative to support 34 due to the potential energy stored in torsion spring 44, as will be further described below.

Figure 9:
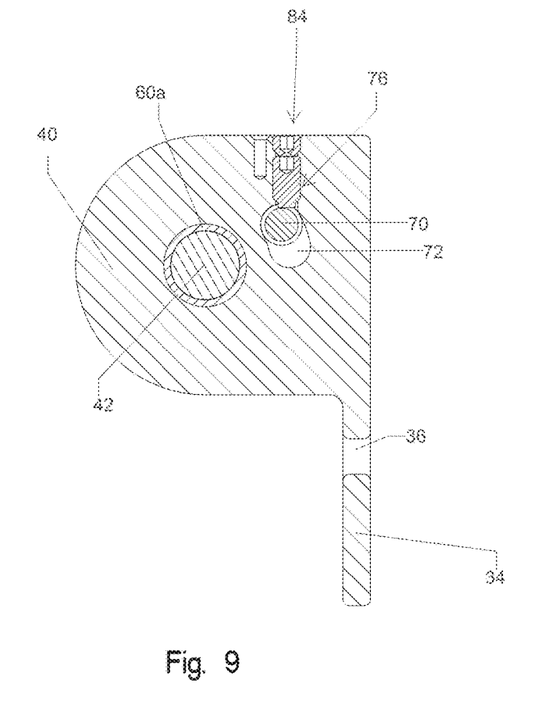

Set screw 76 includes a head of decreased diameter relative to the root of the threaded body of set screw 76. The head of set screw 76 fits into annular groove 79 of pin 70 to prevent axial displacement of pin 70. Referring to FIG. 9, the preload of torsion spring 44 urges rotation of pivot shaft 42 clockwise from the perspective illustrated in FIG. 9. When upper platen assembly 24 is in the open position (indexing for which is further described below), torsion spring 44 remains preloaded in torsion, which acts to urge rotation of tension preload collar 54a counter-clockwise from the perspective of FIG. 9. Set screw 76 acts as a stop preventing such rotation and retaining the preload of torsion spring 44.

Figure 10:
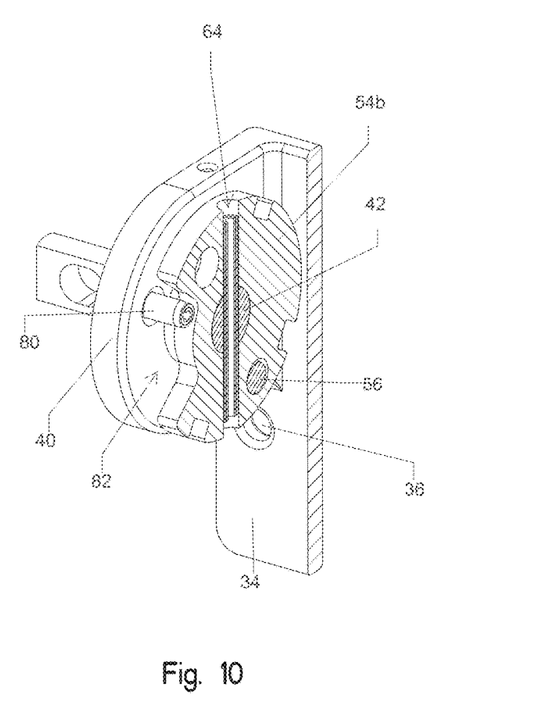

Referring to FIG. 10, at the other end of torsion spring 44, indexing pin 80 extends into arcuate void 82. The limits of travel established by the cooperation of indexing pin 80 and arcuate void 82 establishes stops for the open and closed positions of upper platen assembly 24.

With counterbalance 32 assembled as described above, torsion spring 44 is maintained in a loaded condition urging upper platen assembly 24 from the closed position to the open position. The loaded condition of torsion spring 44 remains throughout the travel of upper platen assembly 24 from its closed position to its open position. If desired, the load assist provided by counterbalance 32 can be adjusted by adjusting the position of set screw 76.

From the position illustrated in FIG. 9, set screw 76 can be further threaded into adjustment aperture to increase the preload on torsion spring 44 and decrease the force application to handle 30 needed to raise upper platen assembly from the closed position to the open position. If set screw 76 is positioned such that pin 70 is distanced from both ends of arcuate slot 72, then set screw 76 can be adjusted to increase or decrease the preload on torsion spring 44 and thereby increase or decrease the force application to handle 30 needed to raise upper platen assembly from the closed position to the open position.

Figure 11:
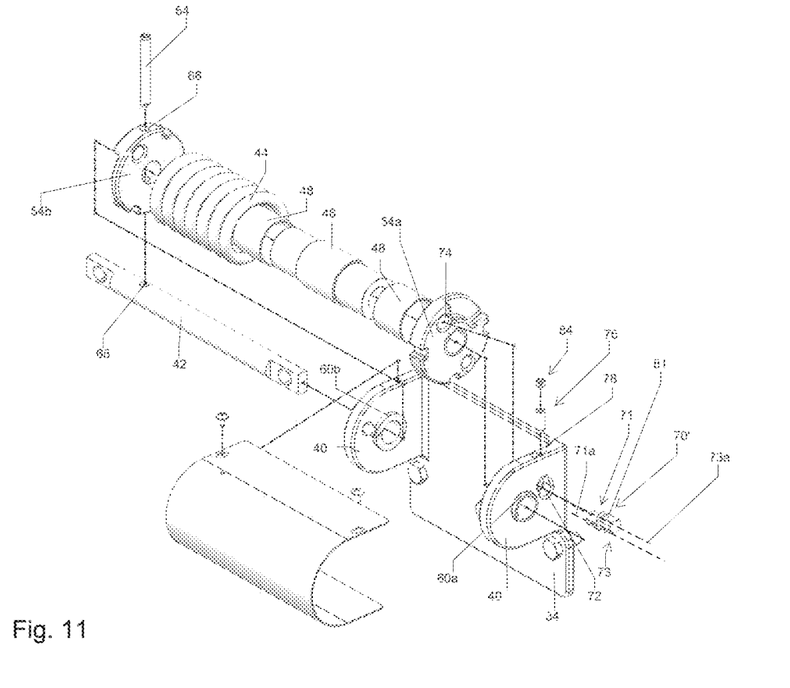
FIG. 11 is an exploded view of an alternative counterbalance assembly in accordance with the present disclosure.

In the alternative embodiment illustrated in FIG. 11, pin 70' is an offset pin having tension preload collar end 71 defining tension preload collar end longitudinal axis 71a and support end 73 defining support end longitudinal axis 73a. Tension preload collar end longitudinal axis 71a is offset from support end longitudinal axis 73a. Pin 70 can be replaced with pin 70' to provide a gross (e.g., more than the full adjustment provided by set screw 76, or an increment of the full adjustment provided by set screw 76, such as ½, 1.5, 2, 2.5, or 3 times the full adjustment provided by set screw 76) adjustment to the preload on torsion spring 44. In alternative arrangements, a plurality of offset pins 70', each providing an adjustment equal to a different increment of the full adjustment provided by set screw 76 can be provided.

A method of adjusting counterbalance 32 may include the step of replacing pin 70 with pin 70'. Additional pins having different offset distances between axes 71a, 73a may replace pin 70' if additional gross adjustment is desired.

In embodiments, support end 73 includes flat surface 81 against which a flat distal end of set screw 76 bears. The cooperation of these flat surfaces sets the rotational orientation of pin 70' about support end longitudinal axis 73a. In certain embodiments, pin 70' may be keyed to arcuate slot 72 to set the rotational orientation of pin 70' about support end longitudinal axis 73a either alone or in combination with cooperating flat surfaces at the end of set screw 76 and the surface of pin 70' against which set screw 76 bears. For example, pin 70' may include side surfaces having the same geometry as the sides of arcuate slot 72. The side surfaces of pin 70' and the side surfaces defining arcuate slot 72 may be nominally planar or nominal arcuate, with a relative large radius of curvature. Tension preload collar end 71 is, in the embodiment illustrated, round like pin aperture 74 into which tension preload collar end 71 is operably positioned.

In alternative embodiments, a single pin 70' may include top and bottom flats for cooperating with the flat end of set screw 76 as described above. In these embodiments, rotating pin 70' 180° about support end longitudinal axis 73a will yield a gross adjustment of the preload on torsion spring 44.

Constructing support 34 as an integral (i.e., one piece, monolithic) element including both arms 40 facilitates reduces costs, assembly time, and tolerance buildup relative to a multi-piece design. This also allows for more precise adjustment of the preload on torsion spring 44.

To prevent backing out of set screw 76 from adjustment aperture, a second set screw 84 can be threaded into the adjustment aperture and into abutment with set screw 76. As illustrated in FIG. 4, cover 38 precludes access to set screw 84 (and; therefore, set screw 76) when cover 38 is secured to support 34.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A griddle comprising:
    a lower cooking surface;
    an upper platen assembly rotatably connected to the lower cooking surface, the upper platen assembly rotatable about a pivot axis from an open position to a closed position relative to the lower cooking surface, whereby a food product can be loaded for cooking between the upper platen assembly and the lower cooking surface when the upper platen assembly maintains the open position and the food product is positioned for cooking between the upper platen assembly and the lower cooking surface when the upper platen assembly maintains the closed position; and
    a counterbalance, the counterbalance having a preload to urge the upper platen assembly from the closed position to the open position, the counterbalance including a set screw, rotation of the set screw moving a stop surface to adjust the preload of the counterbalance.

2. The griddle of claim 1, wherein the lower cooking surface comprises a heated lower platen.

3. The griddle of claim 1, wherein the upper platen assembly comprises a heated upper platen.

4. The griddle of claim 1, wherein the counterbalance comprises:
    a torsion spring and wherein the preload comprises a torsion load on the torsion spring, the stop surface setting a limit establishing the torsion load.

5. The griddle of claim 4, wherein the counterbalance further comprises:
    a pivot shaft, the upper platen assembly secured for rotation with the pivot shaft, the torsion spring helically wound around the pivot shaft, the torsion spring having a first torsion spring free end and a second torsion spring free end; and
    a first tension preload collar, the first tension preload collar rotatably supported relative to the pivot shaft, whereby the first tension preload collar is rotatable relative to the pivot shaft, the first torsion spring free end secured to the first tension preload collar, the stop surface establishing a stop preventing a rotation of the first tension preload collar about the pivot axis due to the preload of the counterbalance.

6. The griddle of claim 5, wherein the counterbalance further comprises:
    a second tension preload collar, the second torsion preload collar secured for rotation with the pivot shaft, the second torsion spring free end secured to the second tension preload collar.

7. The griddle of claim 1, wherein the set screw comprises the stop surface.

8. The griddle of claim 4, wherein the set screw comprises the stop surface.

9. The griddle of claim 5, wherein the set screw comprises the stop surface.

10. The griddle of claim 6, wherein the set screw comprises the stop surface.

11. The griddle of claim 1, wherein comprises a support having a first integral arm extending therefrom and a second integral arm extending therefrom; the support, first integral arm, and the second integral arm forming a monolithic component.

12. The griddle of claim 5, wherein the counterbalance comprises a support having a first integral arm extending therefrom and a second integral arm extending therefrom; the support, first integral arm, and the second integral arm forming a monolithic component, the pivot shaft rotatably supported by the first integral arm and the second integral arm.

13. The griddle of claim 11, wherein the set screw is threadably engaged with the first integral arm, rotation of the set screw moving the set screw to adjust the preload of the counterbalance.

14. The griddle of claim 12, wherein the set screw is threadably engaged with the first integral arm, rotation of the set screw moving the set screw to adjust the preload of the counterbalance.

15. The griddle of claim 14, further comprising a pin extending from the first tension preload collar into an arcuate slot formed in the first integral arm, the arcuate slot sized and shaped to allow the pin undergo a rotation about the pivot axis, the set screw extending into the arcuate slot to block the rotation due to the torsion load of the torsion spring.

16. The griddle of claim 15, further comprising:
   a safety set screw threaded into abutment with the set screw to prevent backing out of the set screw.

17. The griddle of claim 15, wherein the pin comprises an offset pin having a tension preload collar end defining a tension preload collar end longitudinal axis, the offset pin also having a support end defining a support end longitudinal axis, the tension preload collar end longitudinal axis offset from the support end longitudinal axis.

18. The griddle of claim 1, wherein the stop surface is moveable by cooperative threading.

19. The griddle of claim 1, wherein the stop surface is formed on an end of a set screw.

\* \* \* \* \*